May 28, 1940. P. STEIN Re. 21,469

JET PIPE FOR FIRE EXTINGUISHING PURPOSES WITH A WIDENING MOUTHPIECE

Original Filed Sept. 25, 1935

INVENTOR:
PAUL STEIN
by K. M. Freist
his Attorney.

Reissued May 28, 1940 Re. 21,469

UNITED STATES PATENT OFFICE 21,469

JET PIPE FOR FIRE EXTINGUISHING PURPOSES WITH A WIDENING MOUTHPIECE

Paul Stein, deceased, late of Moser, near Magdeburg, Germany, by Elisabeth Stein, heir, Moser, near Magdeburg, Germany Original No. 2,089,304, dated August 10, 1937, Serial No. 42,043, September 25, 1935. Application for reissue July 22, 1939, Serial No. 286,036

10 Claims. (Cl. 299—131)

The invention relates to a jet pipe for fire extinguishing purposes with a widening mouthpiece. The range of application of the jet pipes for fire extinguishing purposes has become considerably larger in recent times in so far as with the jet pipes not only burning buildings have to be extinguished but they are also intended for fighting fires of other kinds, such as conflagration of a forest, of easily inflammable liquids, such as petroleum, oils, varnishes and the like, and further gases having to be suppressed.

For such purposes the usual full jet cannot be employed, which is thrown on to burning objects, but a conical water spray has to be formed which shuts off the scene of a conflagration and rapidly extinguishes the fire. On the other hand, the jet pipe must be of simple construction, i. e., comprise only very few movable parts, and the shape of the jet pipe must be such that the manufacturing is not expensive.

All this is attained with the jet pipe according to the invention, which consists of only two mutually adjustable parts, the outer nozzle-like part, the mouthpiece of which is widened in the simplest shape of a straightly extending cone surface, and of an insert fixed on a pipe section and adapted to be turned and shifted in the mouthpiece.

The insert consists preferably of a shaft to be screwed into the pipe section and having an enlarged head portion of, for instance, cylindrical or somewhat conical shape and merging into the shaft by a bulged surface. By adjusting this insert relative to the conical mouthpiece of the jet pipe conical water sprays of various cone-angle can be produced without the insert projecting beyond the rim of the nozzle body. If the insert is screwed back it engages with a cylindrical portion of the nozzle body and, in this position of the insert, a cylindrical hollow jet can be produced.

The narrowing in the nozzle body has a supporting surface, shoulder, or seat, for the head of the insert or baffle member to seat upon, so that the jet pipe can be shut off completely. This is essential in so far as the person who handles the jet pipe gradually opens the same and consequently the force of reaction, which under circumstances has the tendency to alter the direction of the jet pipe, is gradually increased. The fireman or person handling the jet pipe can accurately adjust it on the scene of conflagration without the danger that at the opening of the jet the position of the jet pipe in the hand of the operator be automatically altered.

To make the jet pipe as light as possible, it must be made of light metal, the mutually movable parts, for instance the screw thread for the adjusting of the jet pipe being of harder metal, whereas for the supporting surface of the insert on the nozzle body special packing material, such as Babbitt metal, is used.

An embodiment of the invention is illustrated by way of example on the accompanying drawing in which.

Figure 1:
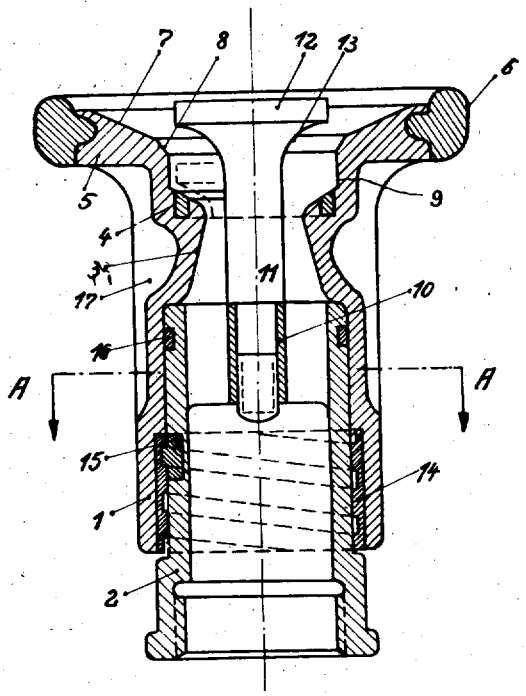
Fig. 1 shows the jet pipe in longitudinal section.
Figure 2:
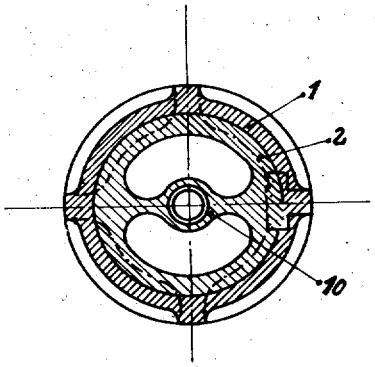
Fig. 2 is a cross section on A—A of Fig. 1.

The jet pipe consists of the nozzle body, made of light metal, such as aluminium or of a combination of aluminium, silumin or the like. The rear part 1 of the nozzle body is cylindrical and serves as guide for the cylindrical part 2 to be screwed on the hose. From the cylindrical part 1 of the nozzle body extends a conical part 3 in the rim of which a packing 4 of Babbitt metal is inserted. The mouthpiece 5 may have a rubber ring 6 in the outer surface of its rim.

The upper face 7 of the mouthpiece is conical and connected with a cylindrical portion 9 by a short transition cone 8. Into a hub 10 of the cylindrical part 2 an insert body, or baffle member, 11 is screwed, the shaft, or shank of which has a circular, cylindrical head 12 connected with the shaft 11 by a concave, or curved, face 13. According to the position the concave face 13 assumes relative to the conical faces 7 and 8 water sprays in the shape of cones with different angle are produced.

If the insert piece 11 is screwed back so that the head 12 is in the cylindrical bore 9, a cylindrical hollow jet is forced out through the jet pipe. If the insert piece 11 is screwed back completely, the head 12 rests tightly upon the insert 4 of Babbitt metal.

The adjusting of insert body to the nozzle is effected by turning the nozzle. The nozzle has on its rear, cylindrical part 1 a screw threaded sleeve 14 of brass or the like, whereas a guide plate 15 of steel is provided in the cylindrical part 2, projections of this plate engaging with the screw thread of the sleeve 14. A packing ring 16 may be arranged in the front portion of the cylindrical part 2. For stiffening the nozzle longitudinal ribs 17 are provided merging at the top into the lower surface of the widened nozzle head.

It will be seen that my improved jet pipe nozzle includes two parts, one mounted on the other for longitudinal adjustment thereon. That is, there is the cylinder or cylindrical part upon which is mounted an end piece for longitudinal adjustment thereon. The end piece, it will be seen, has a flaring outlet and a substantially cylindrical passageway 9. Back of the latter is a shoulder or seat in which I have shown in the present embodiment of the invention the insertion of packing 4. The cylinder, above mentioned, carries with it the baffle member 13 as the same is adjusted forwardly or backwardly. The baffle member is attached to the cylinder by its shank. At the outer end of the shank the baffle member carries the enlarged circular cylindrical head 12 which is connected to the shank by the concave or curved surface 13.

I claim:

1. In a jet pipe nozzle: a cylinder; an end piece mounted on the cylinder for longitudinal adjustment thereon, said end piece being provided with a flaring outlet, a shoulder, and a substantially cylindrical passageway between the shoulder and the outlet; and a baffle member with an enlarged circular head and a supporting shank attached to said cylinder; whereby, by relative longitudinal adjustment of said cylinder with respect to said end piece, the head of said shank may be caused to seat on said shoulder to shut off the nozzle, or moved to a position in said cylindrical passageway to give a straight stream, or moved out into said flaring outlet to give a widely divergent spray.

2. Apparatus as claimed in claim 1 in which the head on the baffle member is cylindrical.

3. Apparatus as claimed in claim 1 in which the head and shank of the baffle member are joined by a curved surface.

4. Apparatus as claimed in claim 1 in which there is a conical face between the flaring outlet and the substantially cylindrical passageway of the end piece.

5. Apparatus as claimed in claim 1 in which the shoulder is provided with a packing member.

6. Apparatus as claimed in claim 1 in which the end piece is threaded on the cylinder to provide the mounting permitting longitudinal adjustment.

7. In a jet pipe nozzle: a cylinder; an end piece mounted on the cylinder for longitudinal adjustment thereon, said end piece being provided with a flaring outlet, a substantially cylindrical passageway behind the outlet, and an annular interior restriction, back of the cylindrical passageway, forming a shoulder; and a baffle member with an enlarged circular head and a supporting shank attached to said cylinder; whereby, by relative longitudinal adjustment of said cylinder with respect to said end piece, the head of said shank may be moved to a position in said cylindrical passageway to give a straight stream, or moved out into said flaring outlet to give a widely divergent spray.

8. In a jet pipe nozzle: a cylinder; an end piece mounted on the cylinder for longitudinal adjustment thereon, said end piece being provided with a flaring outlet, a substantially cylindrical passageway behind the outlet, and an annular interior restriction, back of the cylindrical passageway, forming a shoulder; and a baffle member with an enlarged circular head and a supporting shank attached to said cylinder; whereby, by relative longitudinal adjustment of said cylinder with respect to said end piece, the head of said shank may be caused to approach said shoulder to restrict the flow of the nozzle, or moved to a position in said cylindrical passageway to give a straight stream, or moved out into said flaring outlet to give a widely divergent spray.

9. In a jet pipe nozzle: a cylinder; an end piece mounted on the cylinder for longitudinal adjustment thereon, said end piece being provided with an outlet, a substantially cylindrical passageway behind the outlet, and an annular interior restriction, back of the cylindrical passageway, forming a shoulder; and a baffle member with an enlarged circular head and a supporting shank attached to said cylinder; whereby, by relative longitudinal adjustment of said cylinder with respect to said end piece, the head of said shank may be moved to a position in said cylindrical passageway to give a straight stream, or moved to a position adjacent said outlet to give a widely divergent spray.

10. In a jet pipe nozzle: a cylinder; an end piece mounted on the cylinder for longitudinal adjustment thereon, said end piece being provided with an outlet, a substantially cylindrical passageway behind the outlet, and an annular interior restriction, back of the cylindrical passageway, forming a shoulder; and a baffle member with an enlarged circular head and a supporting shank attached to said cylinder; whereby, by relative longitudinal adjustment of said cylinder with respect to said end piece, the head of said shank may be caused to approach said shoulder to restrict the flow of the nozzle, or moved to a position in said cylindrical passageway to give a straight stream, or moved to a position adjacent said outlet to give a widely divergent spray.

ELISABETH STEIN,
*Heir of the Estate of Paul Stein, Deceased.*